(12) United States Patent
Andersen

(10) Patent No.: US 8,523,217 B2
(45) Date of Patent: Sep. 3, 2013

(54) VEHICLE FRAME FOR TRAILER COUPLER SYSTEM

(76) Inventor: John I. Andersen, Idaho Falls, ID (US)

( * ) Notice: Subject to any disclaimer, the term of this patent is extended or adjusted under 35 U.S.C. 154(b) by 0 days.

(21) Appl. No.: 13/100,090

(22) Filed: May 3, 2011

(65) Prior Publication Data
US 2012/0280473 A1 Nov. 8, 2012

(51) Int. Cl.
*B60D 1/06* (2006.01)
(52) U.S. Cl.
USPC .......................................... 280/511; 280/504
(58) Field of Classification Search
USPC .......................................... 280/507, 511, 504
See application file for complete search history.

(56) References Cited

U.S. PATENT DOCUMENTS

| | | |
|---|---|---|
| 2,107,510 A | 2/1938 | Skinner |
| 2,639,160 A | 5/1953 | Studebaker et al. |
| 3,030,488 A | 4/1962 | Kuckens |
| 3,247,692 A | 4/1966 | Davis |
| 3,263,321 A | 8/1966 | Lombardi |
| 3,269,005 A | 8/1966 | Smith et al. |
| 3,321,950 A | 5/1967 | Gettig |
| 3,355,266 A | 11/1967 | O'Brien |
| 3,358,112 A | 12/1967 | Timmers |
| 3,527,476 A * | 9/1970 | Winckler ................... 280/423.1 |
| 3,601,570 A | 8/1971 | Davis |
| 3,650,546 A * | 3/1972 | Koenig ....................... 280/423.1 |
| 3,679,234 A | 7/1972 | Colliau |
| 3,745,873 A | 7/1973 | Lee |
| 3,774,952 A | 11/1973 | Zorn |
| 3,837,675 A * | 9/1974 | Barnes et al. .............. 280/423.1 |
| 3,968,981 A | 7/1976 | Suarez |
| 3,997,097 A | 12/1976 | Embury |
| 4,051,953 A | 10/1977 | Shoaf |
| 4,058,996 A | 11/1977 | Schaefer et al. |
| 4,060,331 A | 11/1977 | Domer et al. |
| 4,082,211 A | 4/1978 | Embury |
| 4,111,449 A | 9/1978 | Hancock |
| 4,176,853 A * | 12/1979 | Brock ........................ 280/423.1 |
| 4,305,676 A | 12/1981 | Wallbank |
| 4,485,597 A | 12/1984 | Worrallo |
| 4,501,948 A | 2/1985 | Yampolsky et al. |
| D279,179 S | 6/1985 | Landry, Jr. |
| 4,546,994 A * | 10/1985 | Taylor ........................ 280/423.1 |
| 4,576,395 A | 3/1986 | Longoria |
| 4,640,453 A | 2/1987 | Oe et al. |
| 4,643,443 A * | 2/1987 | Husa .......................... 280/491.1 |
| 4,738,293 A | 4/1988 | Ostrom et al. |
| 4,889,212 A | 12/1989 | Temple |
| 4,993,739 A | 2/1991 | Putnam |
| 5,020,351 A | 6/1991 | Castricum |
| 5,037,122 A | 8/1991 | Beckerer, Jr. |
| 5,040,817 A | 8/1991 | Dunn |

(Continued)

FOREIGN PATENT DOCUMENTS

| | | |
|---|---|---|
| GB | 2264474 | 9/1993 |
| JP | 32520 | 2/1983 |
| JP | 04039066 | 2/1992 |
| WO | WO 2007/134070 A2 | 11/2007 |

*Primary Examiner* — Tashiana Adams
(74) *Attorney, Agent, or Firm* — Kirton McConkie; David B. Tingey

(57) ABSTRACT

A coupling mechanism for attaching a fifth wheel RV trailer to a truck for towing. A fifth wheel towball interface which provides unobstructed gimbal action into the connection between truck and trailer. A fifth wheel base having a lightweight structure made from a lightweight material and/or engineered design with lightweight in mind.

20 Claims, 19 Drawing Sheets

(56) References Cited

U.S. PATENT DOCUMENTS

| | | | |
|---|---|---|---|
| 5,105,955 A | 4/1992 | Hawryszkow et al. | |
| 5,163,772 A | 11/1992 | Wood | |
| 5,240,266 A | 8/1993 | Kelley et al. | |
| 5,242,186 A | 9/1993 | Pettersson | |
| 5,357,775 A | 10/1994 | Nakazawa et al. | |
| 5,433,357 A | 7/1995 | Alliff | |
| 5,458,389 A | 10/1995 | Young | |
| 5,600,990 A | 2/1997 | Kelly et al. | |
| 5,620,198 A | 4/1997 | Borchers | |
| 5,868,415 A | 2/1999 | Van Vleet | |
| 5,884,931 A | 3/1999 | McCoy | |
| 6,024,372 A | 2/2000 | Colibert et al. | |
| 6,050,588 A | 4/2000 | Kissack | |
| 6,135,482 A | 10/2000 | Larkin | |
| 6,138,992 A | 10/2000 | Bell | |
| 6,158,761 A * | 12/2000 | King | 280/495 |
| 6,192,726 B1 | 2/2001 | Castricum | |
| 6,199,891 B1 | 3/2001 | Bell et al. | |
| 6,199,892 B1 | 3/2001 | Dahl | |
| 6,234,509 B1 | 5/2001 | Lara | |
| 6,264,229 B1 | 7/2001 | Gill et al. | |
| 6,290,247 B1 | 9/2001 | Schafer et al. | |
| 6,352,228 B1 | 3/2002 | Buerklin | |
| D457,113 S | 5/2002 | Zapushek et al. | |
| 6,382,656 B1 | 5/2002 | Johnson, Jr. | |
| 6,393,874 B1 | 5/2002 | Zapushek et al. | |
| 6,419,258 B1 | 7/2002 | Grote | |
| 6,464,240 B1 | 10/2002 | Seksaria et al. | |
| 6,470,591 B2 | 10/2002 | Rutkowski | |
| D469,723 S | 2/2003 | McCoy et al. | |
| 6,514,443 B1 | 2/2003 | Dorr | |
| 6,540,246 B2 * | 4/2003 | Andersen et al. | 280/417.1 |
| 6,612,604 B2 | 9/2003 | Greaves | |
| 6,663,055 B2 | 12/2003 | Boucher et al. | |
| 6,669,223 B2 | 12/2003 | Sekaria et al. | |
| 6,732,906 B2 | 5/2004 | Andersen | |
| 6,874,804 B2 | 4/2005 | Reese et al. | |
| 6,883,820 B2 | 4/2005 | Freeman | |
| 6,908,099 B2 | 6/2005 | Andersen | |
| 6,974,148 B2 | 12/2005 | Moss et al. | |
| 7,156,412 B2 | 1/2007 | Andersen | |
| 7,159,890 B2 | 1/2007 | Craig et al. | |
| 7,222,510 B2 | 5/2007 | Andersen | |
| 7,378,013 B2 | 5/2008 | Sandler | |
| 7,793,968 B1 * | 9/2010 | Withers | 280/496 |
| 7,828,317 B2 * | 11/2010 | Withers et al. | 280/425.2 |
| 7,878,525 B2 | 2/2011 | Andersen | |
| 2001/0018839 A1 | 9/2001 | Miller et al. | |
| 2002/0113405 A1 | 8/2002 | Moss et al. | |
| 2002/0171226 A1 | 11/2002 | McCoy et al. | |
| 2003/0038453 A1 | 2/2003 | Seksaria et al. | |
| 2003/0052472 A1 | 3/2003 | Moss et al. | |
| 2003/0080534 A1 | 5/2003 | Freeman | |
| 2003/0090085 A1 | 5/2003 | Seksaria et al. | |
| 2003/0106348 A1 | 6/2003 | Nilges | |
| 2003/0173757 A1 * | 9/2003 | Smith | 280/417.1 |
| 2004/0032112 A1 | 2/2004 | Reese et al. | |
| 2005/0067812 A1 | 3/2005 | Moss et al. | |
| 2006/0030932 A1 | 2/2006 | Kantor et al. | |
| 2006/0071448 A1 | 4/2006 | Craig et al. | |
| 2006/0076754 A1 * | 4/2006 | Jamieson | 280/476.1 |
| 2009/0085326 A1 * | 4/2009 | Linger et al. | 280/433 |

* cited by examiner

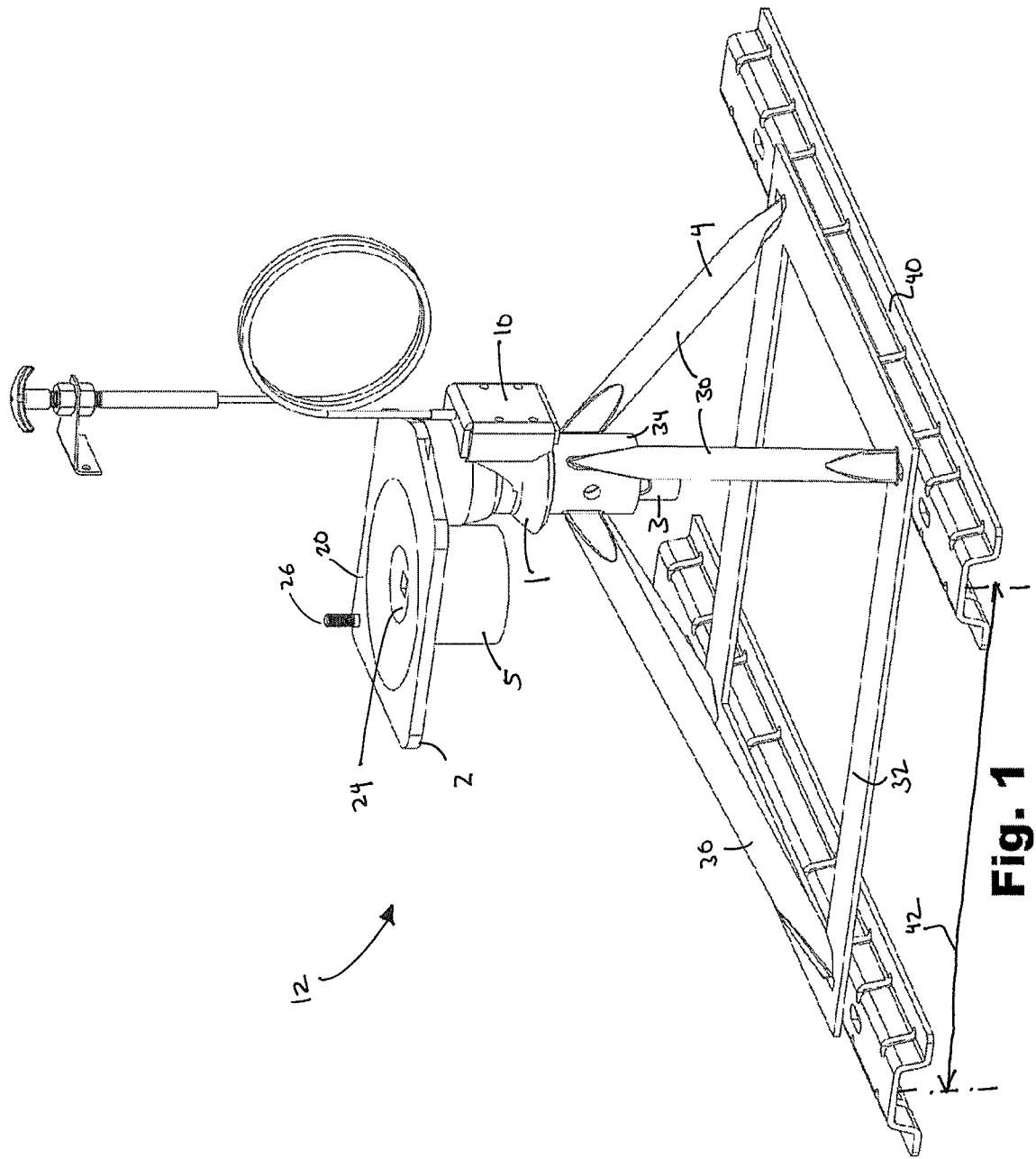

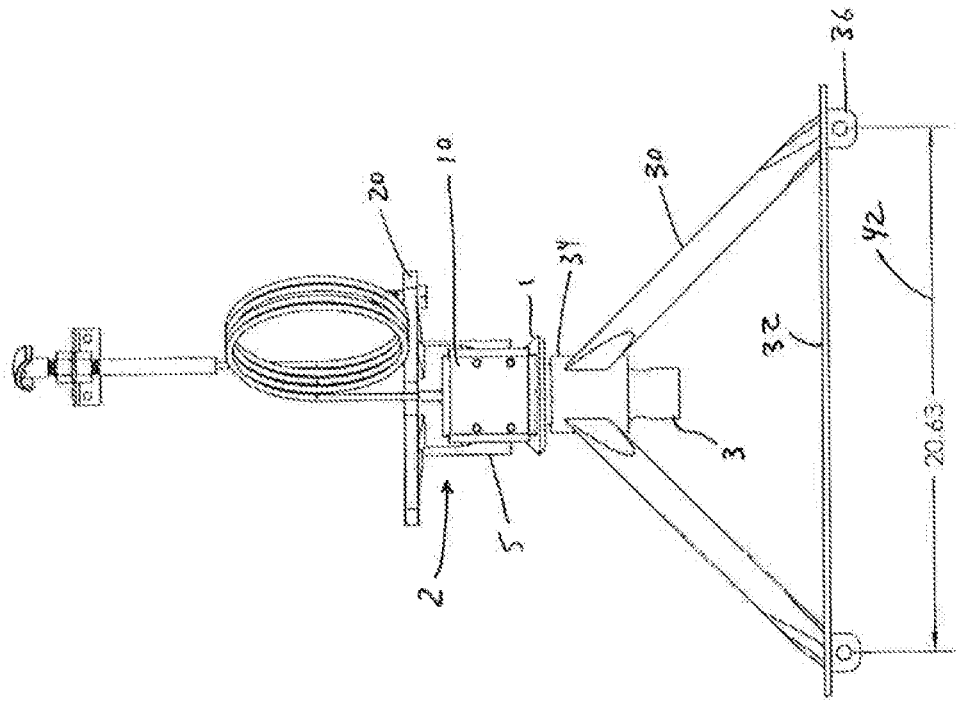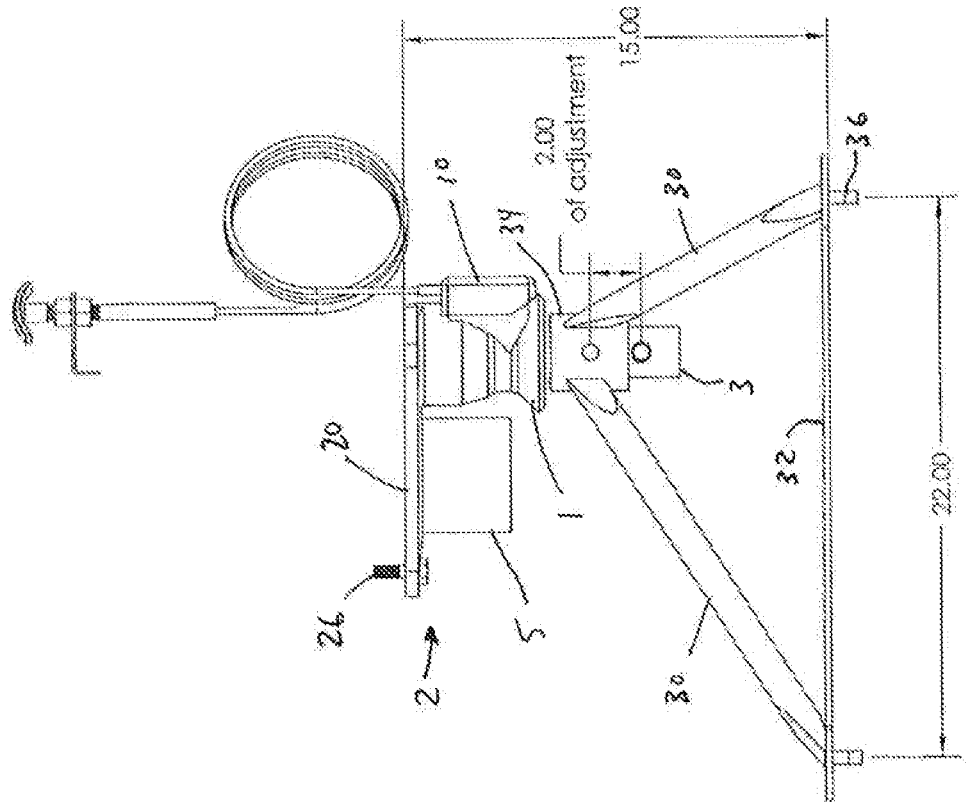

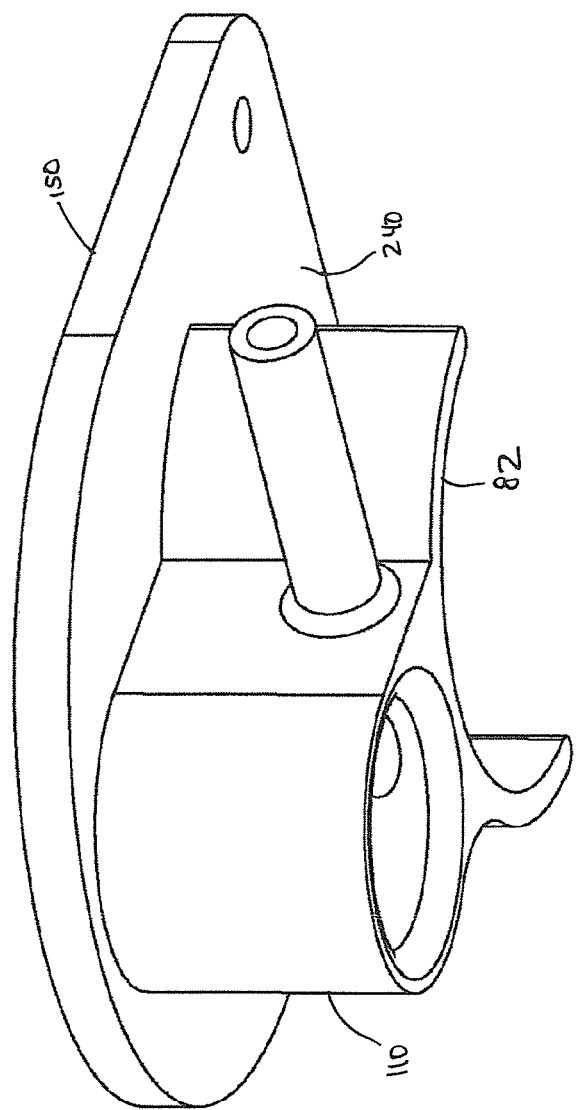

VEHICLE FRAME FOR TRAILER COUPLER SYSTEM

FIELD OF THE INVENTION

The present invention relates to systems and methods for providing a vehicle frame having internal structures for selectively receiving and supporting a fifth wheel coupler system. In particular, the present invention relates to a hidden vehicle frame system adapted to receive a removable fifth wheel coupler system. The present invention further relates to a lightweight fifth wheel coupler system that is easily attached and removed from the hidden vehicle frame system.

BACKGROUND AND RELATED ART

The fifth wheel coupling generally provides a link between a semi-trailer and a towing truck, tractor unit, leading trailer, or dolly. The coupling consists of a coupling pin, or king pin, on the front of the towed trailer, and a horseshoe-shaped coupling device called a fifth wheel on the rear of the towing vehicle. The fifth wheel pivotally accepts or receives the king pin thereby coupling the trailer to the towing truck.

A consumer grade fifth wheel hitch is commonly employed for coupling a recreational vehicle (RV) or trailer to a consumer vehicle, such as a pickup truck. The consumer fifth wheel hitch is generally patterned after the large commercial fifth wheel hitches used for towing industrial vehicles. Consumer grade fifth wheel hitches are not required to carry heavy industrial loads, and are therefore generally designed to be much lighter and smaller than commercial fifth wheel hitches. However, these lighter-weight copies still weigh much more than a single person can conveniently lift and position. In fact, some consumer fifth wheel hitches require the efforts of 3 or 4 people to lift and position the hitch in the bed of the towing vehicle. Similarly, the efforts of multiple people are required to remove the hitch from the towing vehicle should the user wish to use the bed of the towing vehicle for hauling other materials. This inconvenience commonly results in the user leaving the hitch installed as a permanent fixture in the bed of the towing vehicle.

The process of installing a consumer grade fifth wheel hitch in the bed of a towing vehicle often requires extensive modification to the towing vehicle. These modifications are largely dependent upon the bolt-hole pattern of the hitch, as well as the structural features of the towing vehicle's frame and bed. Since the structural features of both fifth wheel hitches and towing vehicles vary greatly between manufacturers, the pairing and installation of a consumer fifth wheel hitch becomes a custom procedure. Thus, when a user purchases a new towing vehicle or a new fifth wheel hitch, the hitch must be custom installed in the towing vehicle.

Thus, while techniques currently exist that relate to equipping consumer towing vehicles with consumer grade fifth wheel hitches, challenges still exist. Accordingly, it would be an improvement in the art to augment or even replace current techniques with other techniques.

SUMMARY OF THE INVENTION

The present invention relates to systems and methods for providing a vehicle frame having internal structures for selectively receiving and supporting a coupler system. In particular, the present invention relates to a hidden vehicle frame system adapted to receive a removable coupler system. The present invention further relates to a lightweight coupler system that is easily attached and removed from the hidden vehicle frame system. In some implementations, a coupler system is provided which weighs less than 18 pounds.

In some implementations of the present invention, a coupler system is provided which includes a consumer grade fifth wheel hitch having a king pin adapter for receiving a king pin of a trailer. The king pin adapter further includes a ball coupler for receiving a towball coupled to a lightweight fifth wheel base. Thus, in some implementations a recreational vehicle or trailer is coupled to a towing vehicle by first selectively connecting the king pin of the trailer to the king pin adapter, and then selectively coupling the ball connector to the towball of the fifth wheel base.

In some implementations of the present invention, the frame of the towing vehicle is modified to include rails whereby to receive and support the lightweight fifth wheel base. For example, in some implementations the frame of the towing vehicle includes fifth wheel adapter rails that are spaced at a predetermined, standard distance so as to compatibly interface with and securely receive the lightweight fifth wheel base. In some implementations, the lightweight fifth wheel base includes mounting pegs that are spaced at a predetermined, standard distance to compatibly insert within mounting holes provided on the fifth wheel adapter rails. In other implementations, the adapter rails are installed beneath the bed of the towing vehicle, such that upon removal of the fifth wheel base the adapter rails do not encumber use of the vehicle's bed.

In some implementations, the bed of the truck is further modified to include access windows corresponding to the mounting holes of the adapter rails, whereby the mounting pegs of the fifth wheel base pass through the access windows to compatibly insert within the mounting holes. Further, in some implementations of the present invention a method of manufacturing a towing vehicle is provided wherein fifth wheel adapter rails are installed on a towing vehicle as a standard feature of the frame of the towing vehicle, the fifth wheel adapter having a plurality of mounting holes for receiving a fifth wheel base having mounting pegs spaced at a standard distance. In other implementations, a coupler system is provided which includes a fifth wheel base having an adapter sleeve for securing the fifth wheel base to a towball installed in the bed of a towing vehicle.

BRIEF DESCRIPTION OF THE DRAWINGS

In order to set forth the manner in which the above recited and other features and advantages of the present invention are obtained, a more particular description of the invention will be rendered by reference to specific embodiments thereof, which are illustrated in the appended drawings. Understanding that the drawings depict only typical embodiments of the present invention and are not, therefore, to be considered as limiting the scope of the invention, the present invention will be described and explained with additional specificity and detail through the use of the accompanying drawings in which:

FIG. 1 is a perspective view of a coupler system having a towball coupled to a towball adapter of a recreational vehicle or trailer, and further being coupled to a set of adapter rails in accordance with a representative embodiment of the present invention;

FIG. 2A is a plane side view of a coupler system having a towball coupled to a towball adapter of a recreational vehicle in accordance with a representative embodiment of the present invention;

FIG. 2B is a plane front view of a coupler system having a towball coupled to a towball adapter of a recreational vehicle in accordance with a representative embodiment of the present invention;

FIG. 7B is a perspective view of an adapter plate and ball coupler of a coupler system in accordance with a representative embodiment of the present invention;

DETAILED DESCRIPTION OF THE INVENTION

Figure 3:
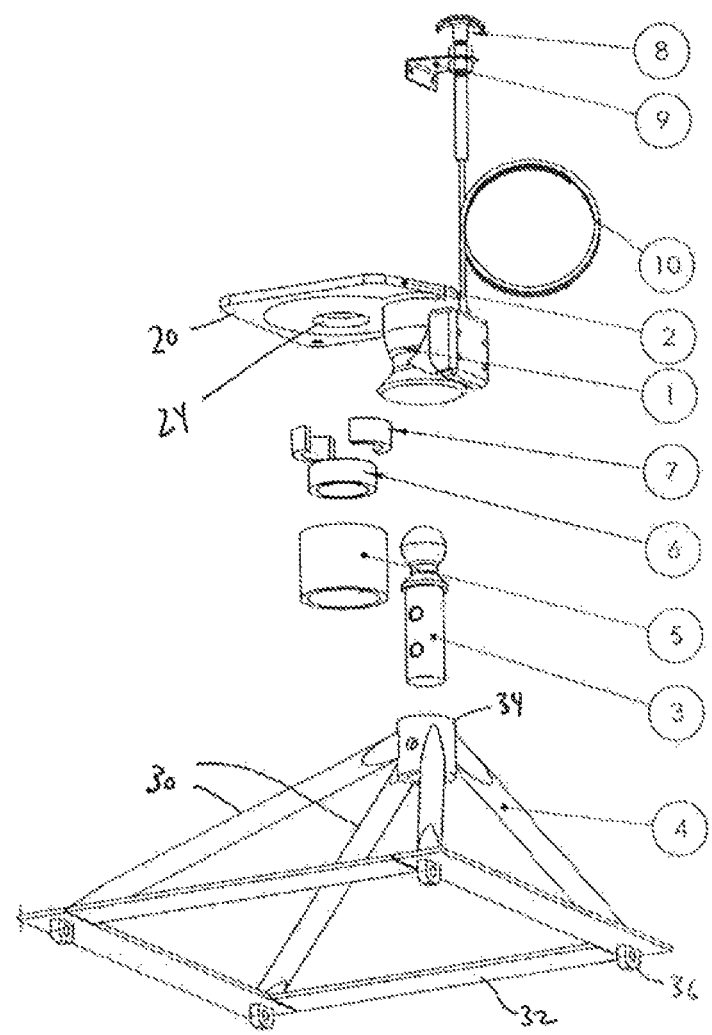
FIG. 3 is an exploded perspective view of a coupler system in accordance with a representative embodiment of the present invention.

The present invention relates to systems and methods for providing a vehicle frame having internal structures for selectively receiving and supporting a coupler system, such as a fifth wheel coupler system. In particular, the present invention relates to a hidden vehicle frame system adapted to receive a removable coupler system. The present invention further relates to a lightweight coupler system that is easily attached and removed from the hidden vehicle frame system.

The term "coupler system" as used herein shall include a fifth wheel coupler system, such as the Ultimate Connection coupler system by Andersen Manufacturing, Inc. The term shall further include other standard fifth wheel and gooseneck coupler systems, wherein the standard systems are modified to provide the benefits discussed herein.

Referring now to FIG. 1, a lightweight coupler system 12 is shown. In some embodiments, coupler system 12 is comprised of two major components, namely, a lightweight fifth wheel base 4 and a fifth wheel trailer king pin adapter 2. In some embodiments, a coupler system 12 is provided weighing less than 18 pounds. King pin adapter 2 generally comprises an adapter plate 20 having a collar 5 and opening 24 for receiving and housing a king pin of a recreational vehicle. In some embodiments, adapter plate 20 further comprises an anti-rotational lock pin or set screw 26 to assist and insure non-rotation of adapter plate 20 to the pin box of the recreational vehicle. Set screw 26 further prevents rotation between adapter or mounting plate 20 and the pin box of the recreational vehicle as the towing vehicle and the recreational vehicle or trailer turn in reference to each other.

In some embodiments, the fifth wheel base 4 comprises a lightweight material or structural design having high compressive and/or tensile strength, such as steel, aluminum, or alloys thereof. In other embodiments, base 4 comprises a rigid composite material, such as a carbon fiber laminate, or a carbon fiber-reinforced polymer material.

Adapter plate 20 further comprises a towball coupler 1 having an interior surface for receiving a towball 3 feature of the fifth wheel base 4. In some embodiments, base 4 comprises a towball 3 having a greaseless, self lubricating cap. In other embodiments, towball 3 is a height adjustable towball, wherein the height of the towball may be adjusted to allow proper clearance between truck sideboards and trailer overshot, when encountering rough terrain.

King pin adapter 2 and towball 3 are coupled together by aligning coupler 1 and towball 3 such that towball 3 is securely inserted within the interior surface of the towball coupler 1. In some embodiments, towball coupler 1 further comprises a latch remote control cable assembly 10 whereby to actuate an internal locking mechanism. This locking mechanism is provided to permit selective coupling of king pin adapter 2 to fifth wheel base 4. In some embodiments, cable assembly 10 is actuated to permit towball 3 to be inserted within towball coupler 1. Following insertion of towball 3 into towball coupler 1, cable assembly 10 is actuated thereby preventing withdrawal of towball 3 from towball coupler 1.

In some embodiments, lightweight fifth wheel base 4 includes a framed construction comprising a plurality of tubular struts 30 having a first end fixedly attached to a base surface 32, and a second end fixedly attached to a sleeve or ball housing 34 for receiving a shaft portion of towball 3. One having skill in the art will appreciate that the teaching of adapting or converting a fifth wheel system of a recreational vehicle to a towball connection may be accomplished by other methods within the spirit of the present invention. For example, in some embodiments the king pin of the recreational vehicle is replace with a towball coupler whereby to directly receive towball 3 of base 4. Alternatively, in some embodiments the king pin of the recreational vehicle is replaced with a towball 3, and base 4 is modified to include a towball coupler configured to receive towball 3. Thus, one having skill in the art will appreciate that the concepts taught herein are novel and are capable of being applied to a traditional fifth wheel configuration through any number of alternative designs.

In some embodiments, tubular struts 30 are arranged so as to provide a fifth wheel base 4 having a pyramid or quasi-pyramid shape. This triangulated support structure prevents stresses from being transmitted to the towing vehicle structure in a detrimental way. Thus, the use of tubular struts 30 in combination with base 32 effectively distribute the weight of the recreational vehicle to the adapter rails 40 or frame of the towing vehicle.

In some embodiments, the standard frame structure of a towing vehicle is manufactured to include adapter rails 40 spaced at a predefined distance 42 for receiving a fifth wheel base 4. Thus, if an owner of a towing vehicle desires to equip the towing vehicle with a lightweight coupler system 12, the owner simply needs to purchase the lightweight base 4 and attach the base 4 to the adapter rails 40. In some embodiments, adapter rails 40 are located under the bed of the towing vehicle such that the adapter rails are not visibly located within the bed of the towing vehicle. Thus, the bed of the towing vehicle is modified to include access windows whereby base 4 may be coupled to rails 40 through the bed of the towing vehicle. In some embodiments, access windows are pre-manufactured features of the towing vehicle frame. As such, a coupler system, a fifth wheel system, or gooseneck towing package system may be added to the vehicle without the need for custom aftermarket hardware, brackets and installation. In other embodiments, access windows are optionally added by the owner in preparation for accessing rails 40 to use the lightweight coupler system 12. Further, in some embodiments pre-manufactured access windows are fitted with plugs to prevent debris and water from passing through the access windows. Still further, in some embodiments the bed of the towing vehicle includes marks or labels indicating where to provide the access windows.

Referring now to FIGS. 2A and 2B, in some embodiments base 4 further includes mounting lugs 36 for coupling base 4 to adapter rails 40. Once positioned within rails 40, base 4 is secured to rails 40 by inserting pins through the transverse holes in the mounting lugs 36 beneath the top web of the rails 40 to prevent the assembly 12 from lifting off the rails 40 during use. Alternatively, mounting lugs 36 may be located on rails 40 and project upwardly to interface with a tensioned base surface 32 of base 4. Further, in some embodiments base 4 and rails 40 both include mounting holes whereby base 4 is coupled to rails 40 via a fastener, such as a bolt and nut.

Referring now to FIG. 3, in some embodiments collar 5 comprises a threaded nut having an internal set of threads. The king pin of the recreational vehicle is further fitted with a collar 6 having an external set of threads compatible with the threads of collar 5. Collar 6 comprises a tapered inner diameter configured to receive a split wedge collar 7. Split wedge collar 7 mounts in the neck of the king pin on the pin box of the recreational vehicle. As collar 5 is threaded onto the external threads of collar 6, split wedge collar 7 tightens around the neck of the king pin thereby drawing the king pin further into collar 5 and securing adapter plate 20 against the pin box bottom plate. Thus, the king pin of the recreational vehicle is adjustably secured within collar 5 by tightening or loosening collar 5 relative to threaded collar 6 and split wedge collar component 7.

In some embodiments, latch remote control cable assembly 10 further comprises an extension cable and mounting bracket 9 to locate handle 8 at a convenient location for releasing towball 3 from towball coupler 1.

Figure 4:
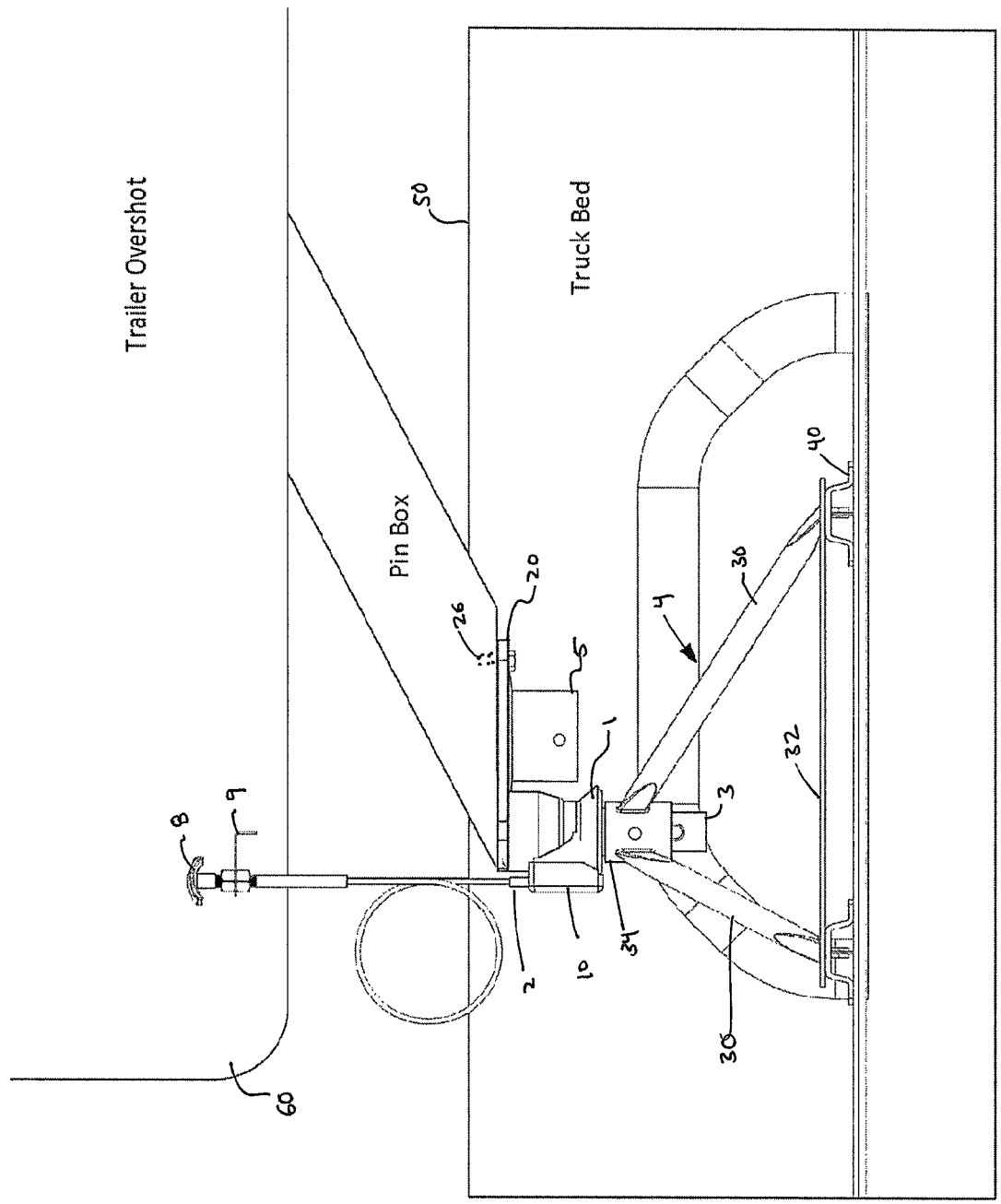
FIG. 4 is a side view of a coupler system installed within a truck bed of a towing vehicle and coupled to a towball adapter of a recreational vehicle in accordance with a representative embodiment of the present invention.

With reference to FIG. 4, a lightweight coupler base or fifth wheel base 4 is shown installed in the bed of a towing vehicle 50. Further, a king pin adapter 2 is shown installed on the pin box of a recreational vehicle 60. In some embodiments, ball coupler 1 is welded to mounting plate 20 which mounts to the underside of the pin box and king pin assembly on the recreational vehicle 60. As such, the pin box of the recreational vehicle 60 is adapted to a ball style connection as opposed to the traditional fifth wheel style connection. In some embodiments, the ball style connection allows total unobstructed gimbal motion between the towing vehicle 50 and the recreational vehicle 60. In other embodiments, the ball style connection permits total unobstructed gimbal motion without inducing undue stress on the king pin, the pin box, and/or the trailer frame.

In some embodiments, the position of sleeve 34 is offset from center of base surface 32. This feature allows base 4 to be interchangeably used in towing vehicles having either long beds or short beds. When mounting the lightweight fifth wheel base 4 in a short bed truck, base 4 is rotated 180° thereby moving ball coupler 1 towards the rear of the towing vehicle. In some embodiments, rotation of base 4 by 180° moves ball coupler 1 approximately ten inches closer to the rear of the towing vehicle. In other embodiments, the long bed installation of base 4 positions ball coupler 1 approximately a few inches in front of the towing vehicle's rear axle. Conversely, the short bed installation of base 4 positions ball coupler 1 approximately a few inches behind the towing vehicle's rear axle. Thus, the short bed installation provides additional clearance between the front of the trailer overshot and the cab of the towing vehicle to prevent collision between the corner of the trailer 60 and the back of the truck 50 when turning sharp corners on the road; for example, when parking in tight places which requires crabbing of the truck-trailer relationship.

In some embodiments, the ball style connection of base 4 is elevated within the truck bed of the towing vehicle 50 so as to be approximately equal in height to the king pin of the fifth wheel trailer 60 pin box structure, thereby providing that the fifth wheel trailer 60 be positioned approximately parallel to the truck bed surface of the towing vehicle. Accordingly, some embodiments of the present invention eliminate excessive leverage which otherwise may be encountered in coupling a fifth wheel trailer 60 to a towing vehicle.

Figure 5:
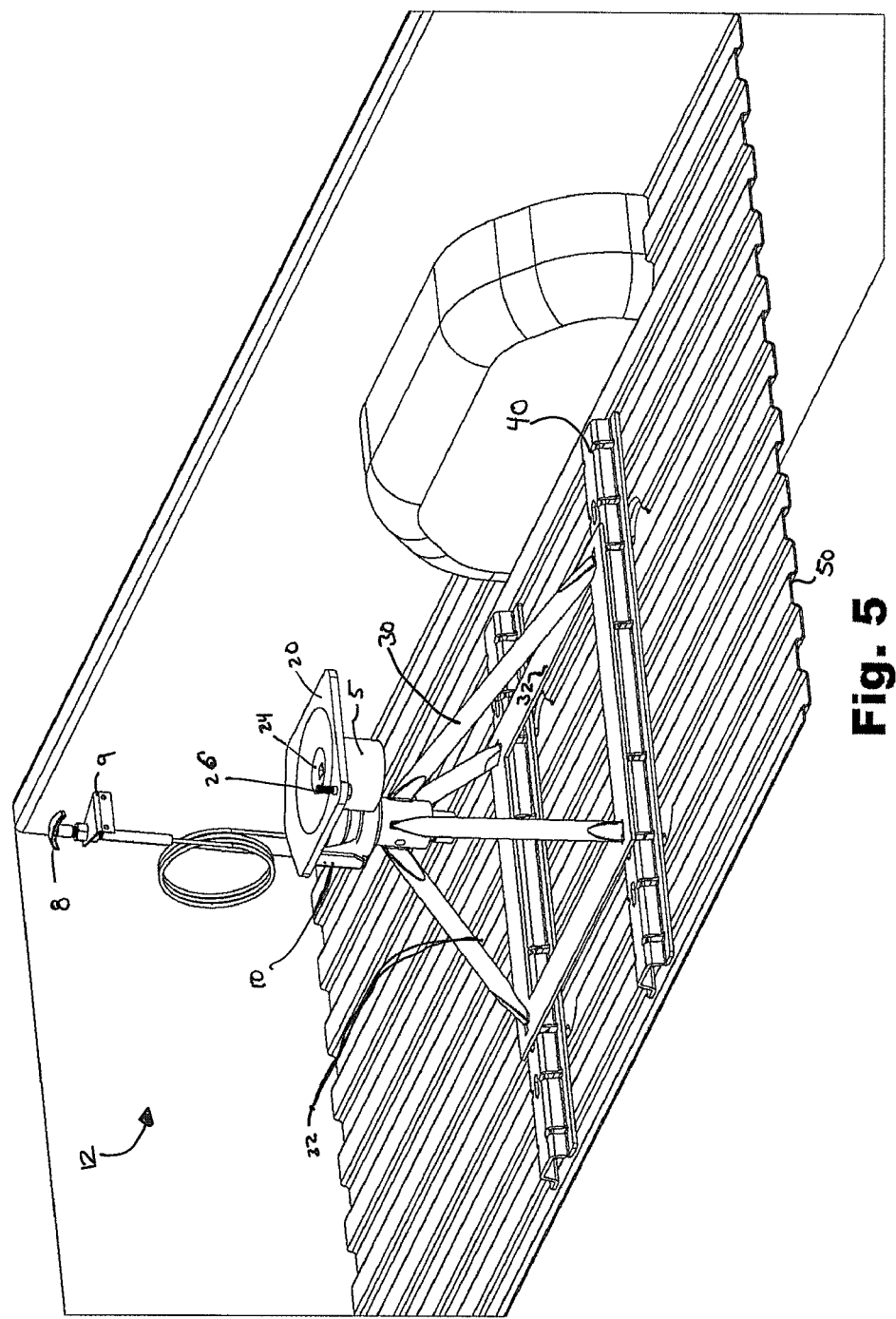
FIG. 5 is a perspective view of a coupler system installed within a truck bed of a towing vehicle and coupled to a towball adapter of a recreational vehicle in accordance with a representative embodiment of the present invention.

Referring now to FIG. 5, a perspective view of the installed lightweight coupler system 12 is shown. In some embodiments, the lightweight nature of the system 12 enables a single person to install and remove the lightweight base 4 in less than 30 seconds. Additionally, the modular nature of system 12 enables a single person to easily remove base 4 from the towing vehicle bed 50 to provide a clean truck bed. Still further, in some embodiments the gimbal action of the towball system brings full unobstructed gimbal action into the connection between the towing vehicle and the recreational vehicle. This feature allows for connection and disconnection between the two vehicles regardless of any twisted and angular relationships between the two vehicles due to irregular terrain.

Figure 6A:
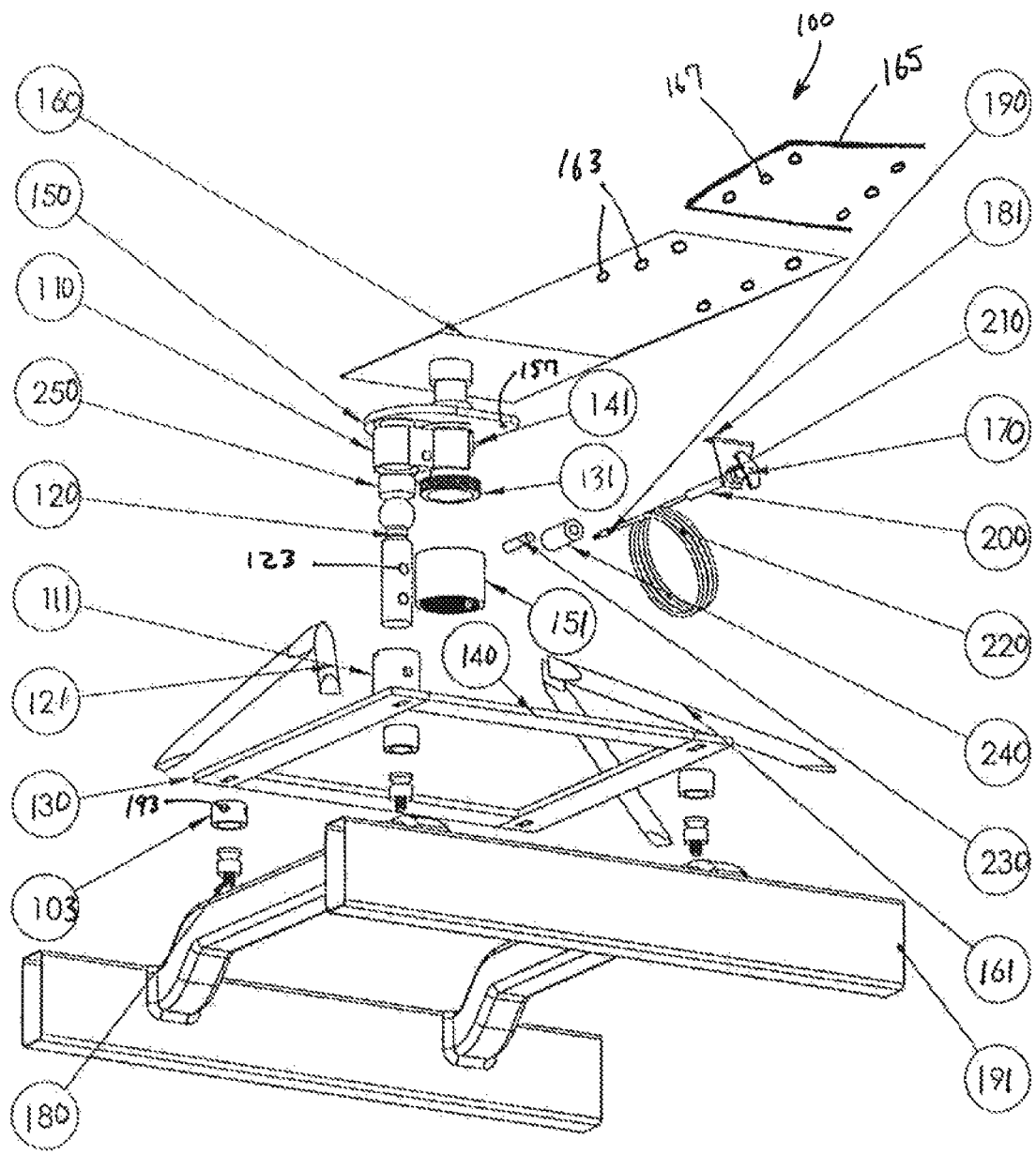
FIG. 6A is an exploded perspective view of a coupler system in accordance with a representative embodiment of the present invention.

Referring now to FIG. 6A, an exploded view of a lightweight coupler system 100 is shown. In some embodiments, base frame 130 of the riser assembly is coupled to a cross-member structure 191 or platform which comprises a portion of a truck frame. In some embodiments, a stock truck frame is modified to include the platform structure 191. Platform structure 191 is modified to include four threaded holes into which four adapter spools 180 are threadedly inserted. Following use of the coupler system 100, spools 180 are unthreaded from platform structure 191 to provide a clean truck bed. In some embodiments, the truck manufacturer provides access holes in the bed of the truck to permit spools 180 to be accessible from within the bed of the truck. Following removal of spools 180, in some embodiments plugs are provided whereby to temporarily fill access holes in the bed of the truck. Collars 103 are welded to base frame 130 so as to be aligned with spools 180. Base frame 130 is secured to platform structure 191 as collars 130 are placed over spools 180 and secured by inserting a pin through access holes 193. Conversely, base frame 130 is removed from platform structure 191 by removing pins from access holes 193, in a reverse manner.

Coupler system 100 further includes a plurality of tubular struts 121 and 161 which are welded to base frame 130 and ball housing 111. Ball housing 111 comprises a cavity for receiving ball assembly 120. In some embodiments, ball assembly 120 comprises a plurality of pin holes 123 to allow for a vertical height adjustment of the towball. This adjustment is provided to allow minor adjustment for clearance requirements between the side boards of the truck and the bottom side of the overshoot of the fifth wheel trailer.

In some embodiments, coupler housing 110 further comprises a polymer ball socket 250 which is installed or inserted into the cavity of coupler 110 to provide a self lubricating interface between the hitch ball 120 and the coupler 110. In some embodiments, the coupler housing 110 is manufactured from a custom engineered aluminum extrusion which is subsequently welded to the aluminum mounting plate 150 which attaches directly to the fifth wheel pin and pin box 160 via a split tapered collar 141, a threaded collar 131, and a retaining nut 151, as taught in U.S. Pat. No. 6,540,246, incorporated herein by reference.

Coupler system 100 further comprises an aluminum tubular housing 240 which houses latch pin 230 when the coupler latch pin is open so the trailer coupler can be removed or installed over towball 120. Remaining member 170, 181, 190, 200, 210, and 220 of the remote latch assembly are discussed and further taught in U.S. Pat. No. 6,540,246.

In some embodiments, coupler system 100 further comprises an interchangeable ball coupler box 160, wherein ball coupler box 160 comprises a plurality of mounting holes 163 for attaching ball coupler box 160 to frame 165 of a fifth wheel trailer. Ball coupler box 160 is attached to frame 165 by aligning holes 163 with holes 167 and securing with a fastener, such as a plurality of pins or nuts and bolts.

Figure 6B:
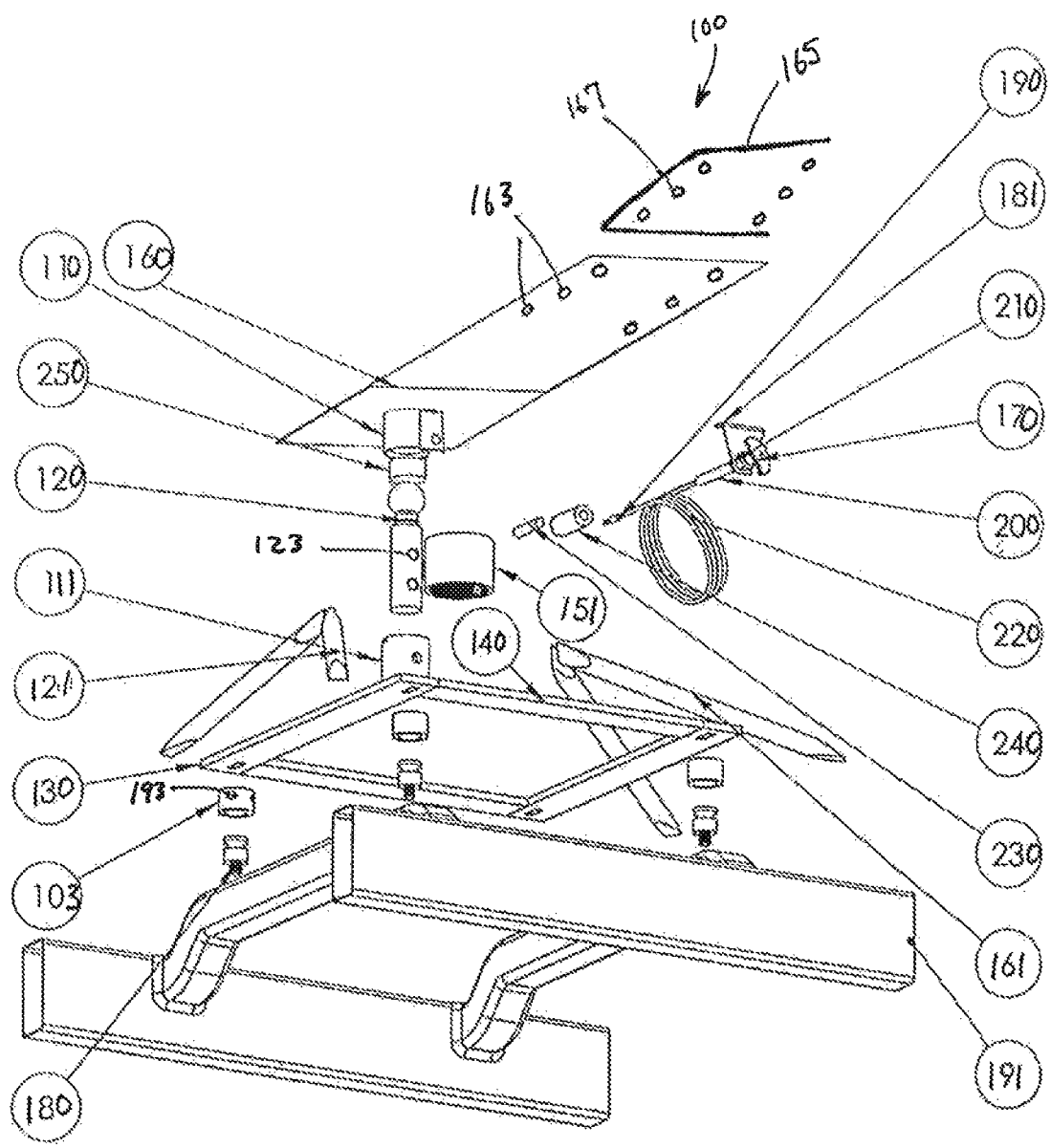
FIG. 6B is an exploded perspective view of a coupler system in accordance with a representative embodiment of the present invention.

In some embodiments, a modular pin box 260 is provided wherein the kingpin is replaced with a ball coupler 110, as shown in FIG. 6B. Thus, towball 120 is directly coupled to pinbox 160 via ball coupler 110. Accordingly, some embodiments of the present invention provide a complete fifth wheel coupler system comprising a system of compatible interconnections from the frame of the fifth wheel trailer to the frame of the towing vehicle.

Figure 7A:
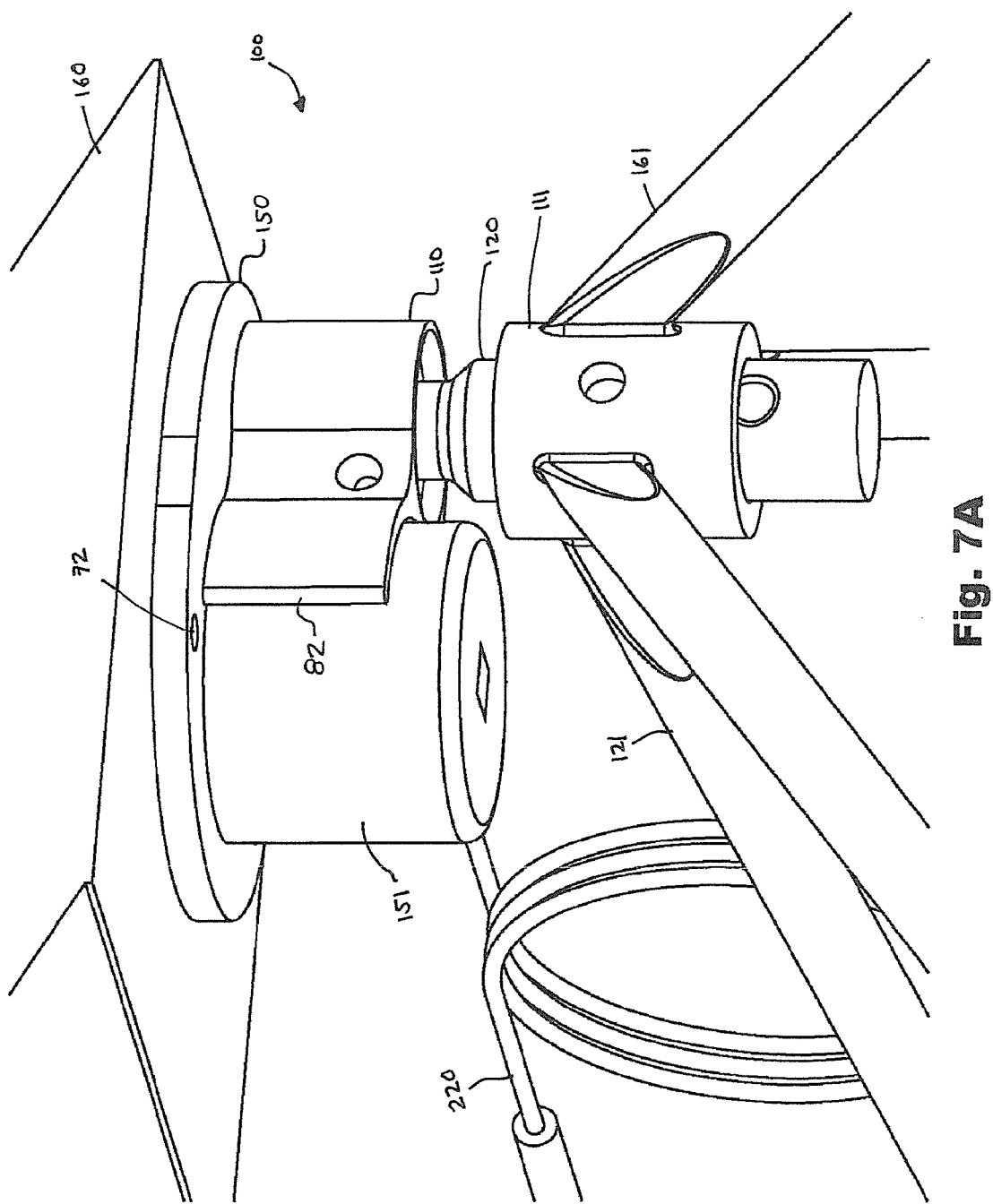
FIG. 7A is perspective view of an assembled coupler system in accordance with a representative embodiment of the present invention.

Referring now to FIGS. 7A and 7B, a modified adapter plate 150 and ball coupler 110 is shown. In some embodiments, adapter plate 150 is directly welded to ball coupler 110, thereby providing a unitary unit. Ball coupler 110 generally comprises a sleeve having an inner diameter to receive towball 120, as previously discussed. In some embodiments, ball coupler 110 further comprises a half-sleeve structure 82 having a diameter for receiving collar 151.

Mounting plate 150 further comprises at least one threaded hole 72 configured to receive a set screw (not shown). Thus, following assembly of the coupler system 100, set screws are threaded and advanced within holes 72 so as to bind against pin box 160. The set screws are tightened so as to prevent rotation of mounting plate 150 relative to pin box 160. In some embodiments, pin box 160 further comprises indents to receive a portion of the set screws. In other embodiments, set screws are tightened into pin box 160 thereby forming a divot in pin box 160 to prevent undesirable rotation of mounting plate 150.

Figure 8A:
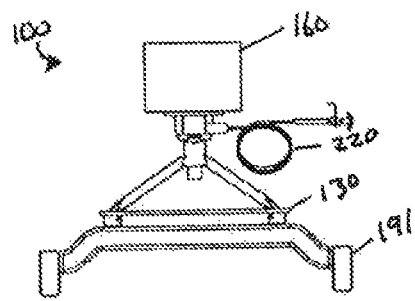
FIGS. 8A-8C are perspective views of a coupler system in accordance with a representative embodiment of the present invention.
Figure 8B:
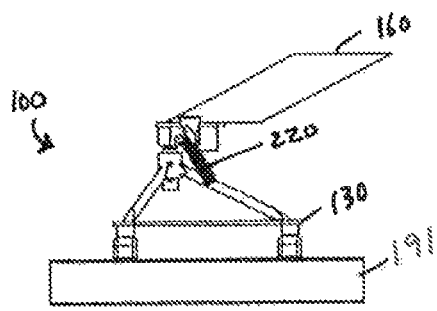
Figure 8C:
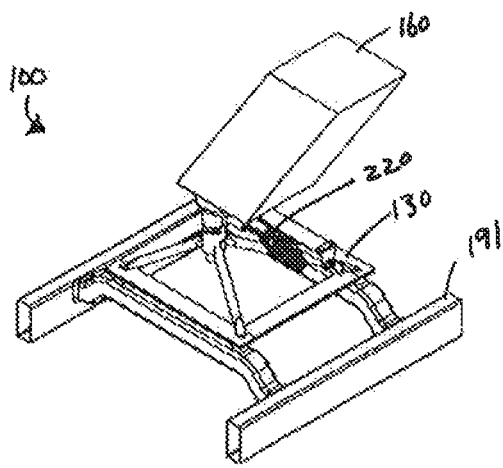
Figure 9:
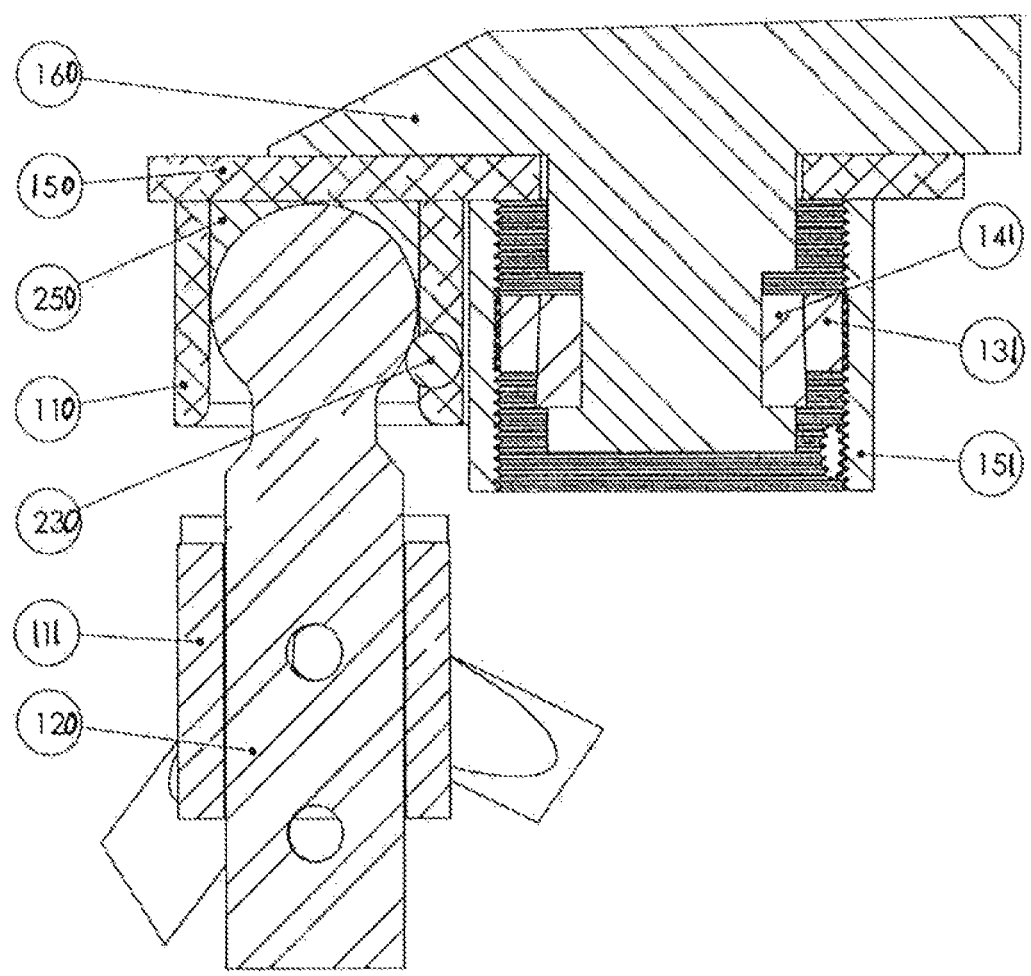
FIG. 9 is a cross-section view of a coupler system in accordance with a representative embodiment of the present invention.
Figure 10:
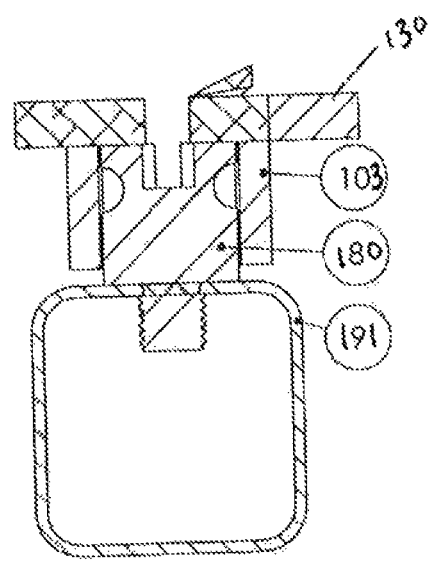
FIG. 10 is a cross-section view of the interface between a platform structure and a coupler system in accordance with a representative embodiment of the present invention.

With reference to FIGS. 8A through 8C, various perspective views of the fifth wheel coupler system 100 are shown. The detailed interconnections between towball 120, ball coupler 110, and pin box 160 are shown in FIG. 9. The detailed interconnections between base 130, collar 103, spool 180 and platform structure 191 are shown in FIG. 10.

Figure 11:
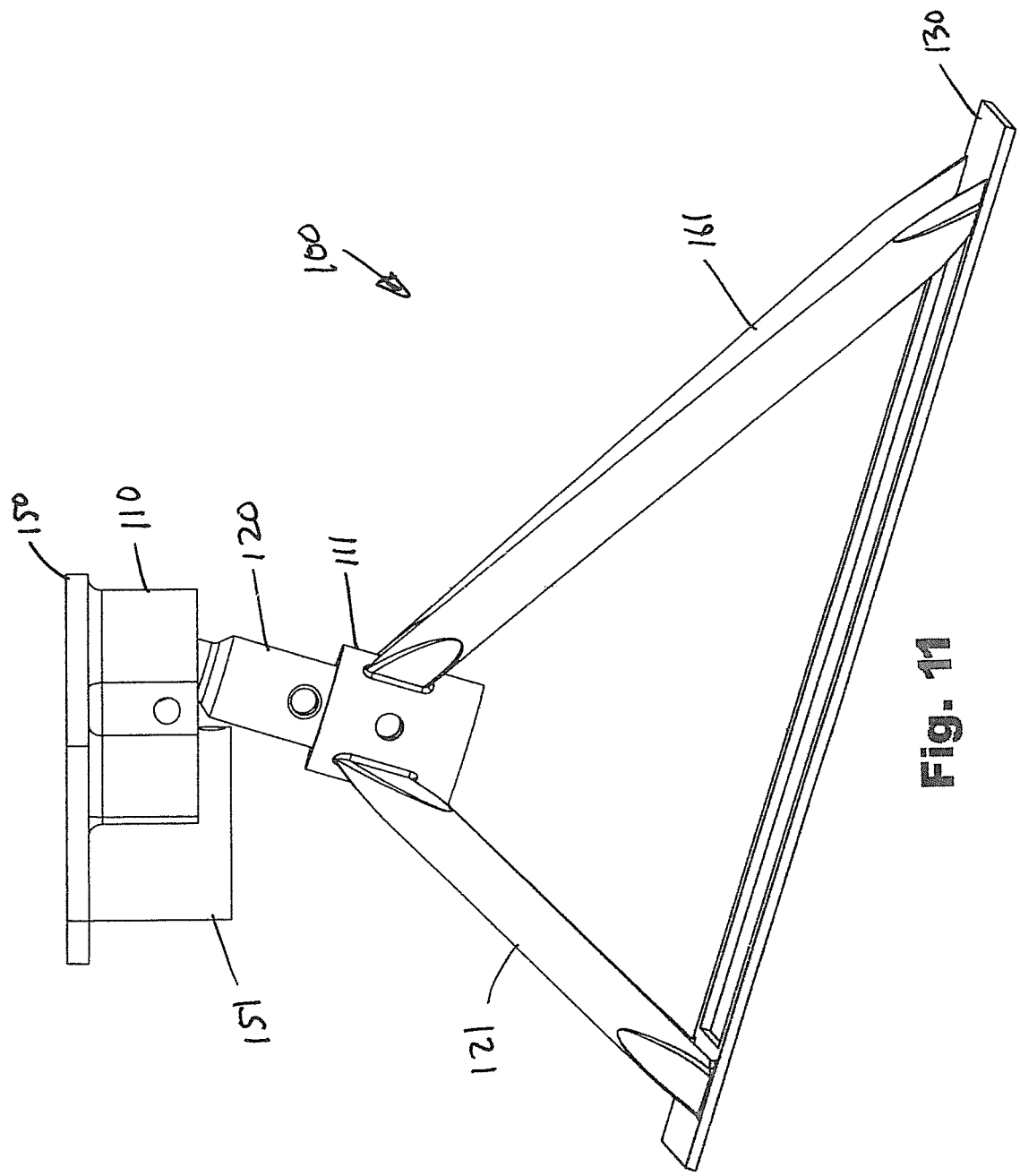
FIG. 11 is a perspective view of a coupler system in accordance with a representative embodiment of the present invention.

In some embodiments, a ball and socket interface between the base assembly 130 and adapter plate 150, via towball 120 and ball coupler 110, permits a gimbaled relationship between the towing vehicle and the fifth wheel trailer, as shown in FIG. 11. In some embodiments, this unrestricted gimbal action permits 360° rotation between the towing vehicle and the trailer from a flat plane. This unrestricted motion further eliminates all stresses which would be experienced with standard fifth wheel coupler systems and assemblies.

Figure 12:
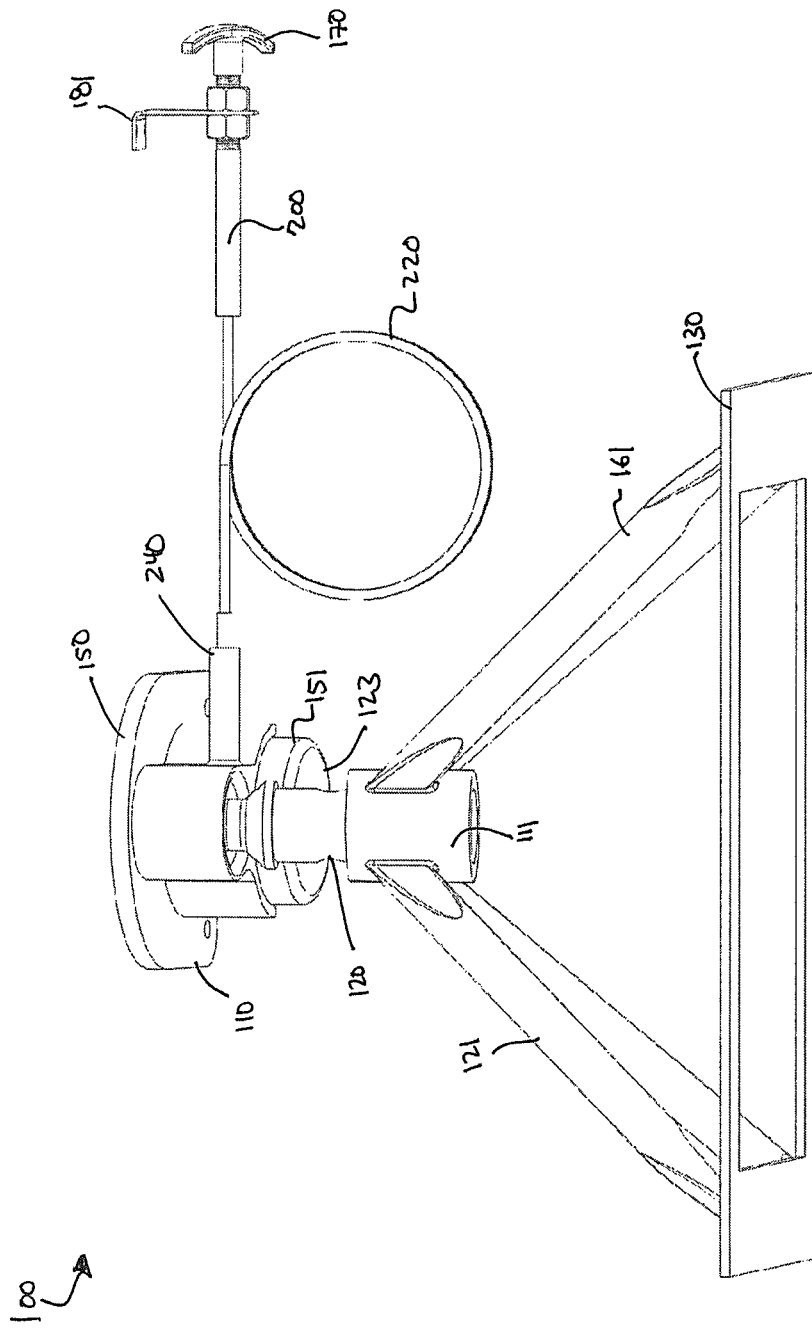
FIG. 12 is a perspective view of a coupler system in accordance with a representative embodiment of the present invention.
Figure 13:
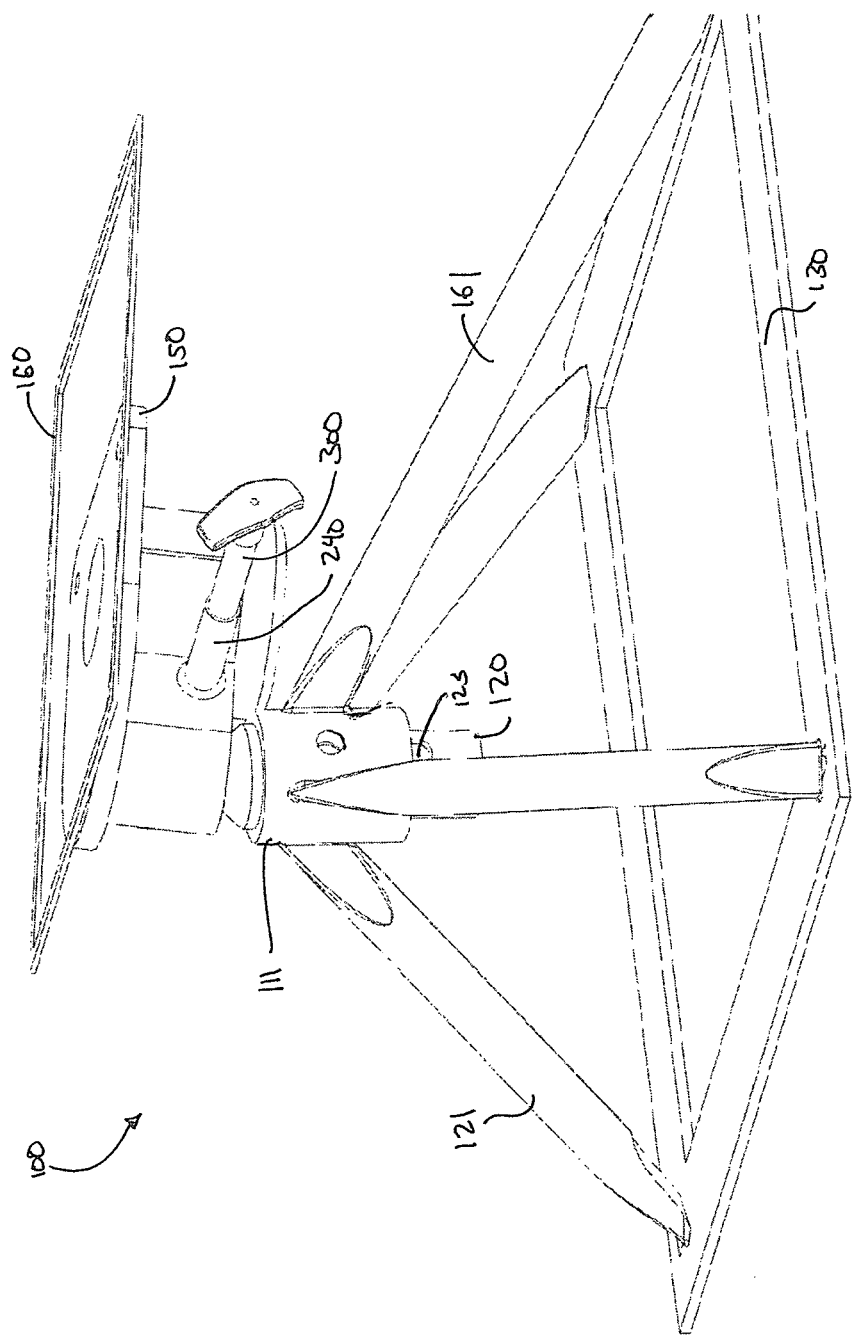
FIG. 13 is a perspective view of a coupler system in accordance with a representative embodiment of the present invention.

With reference to FIG. 12, fifth wheel coupler system 100 is shown with remote latching cable 220 and accompanying latching components 170, 181, 200 and 240 in a coupled condition. FIG. 13 shows fifth wheel coupler system 100 with semi-remote latching actuator 300.

Figure 14:
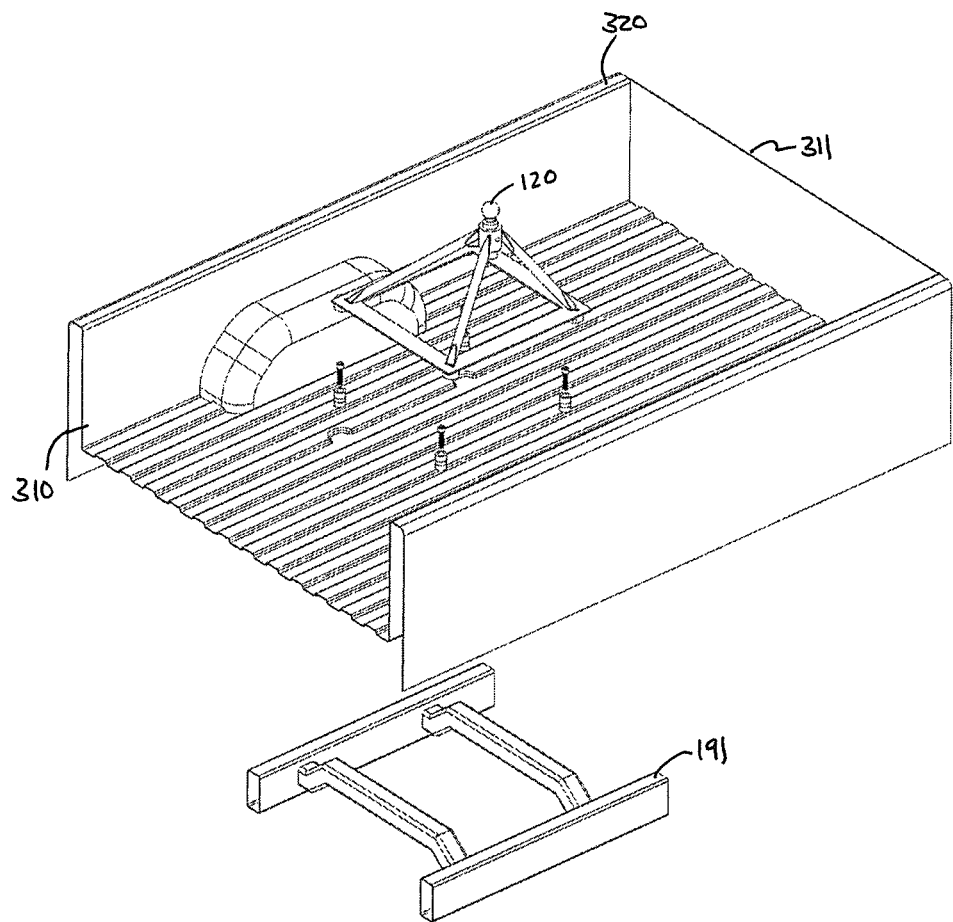
FIG. 14 is an exploded perspective view of a long bed installation of a coupler system in accordance with a representative embodiment of the present invention.
Figure 15:
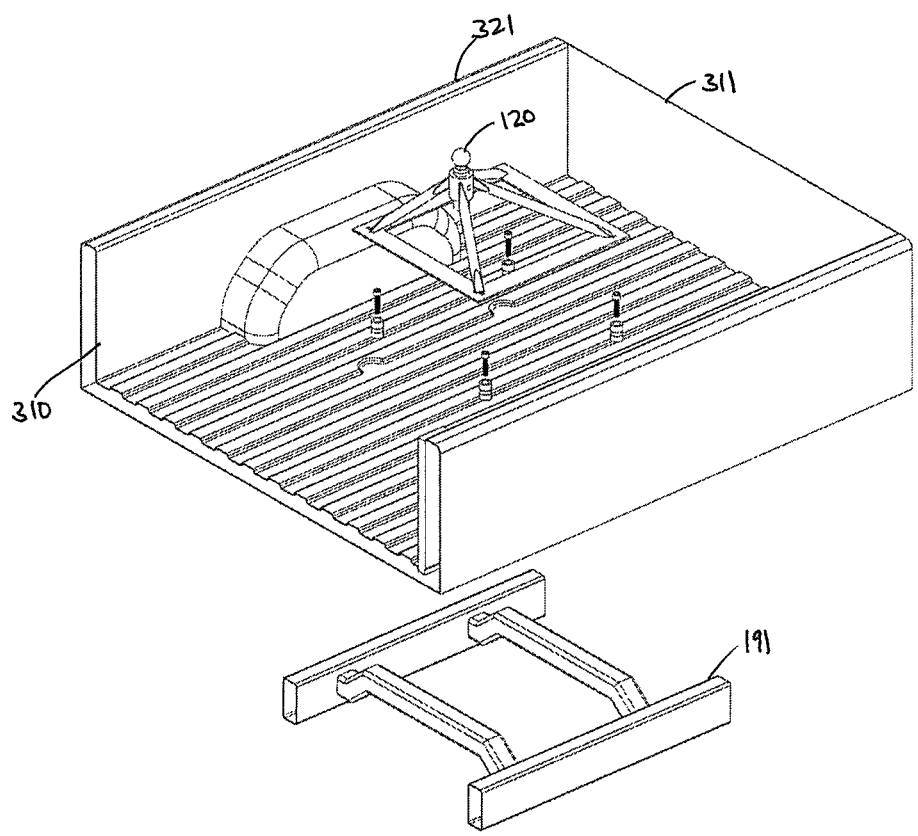
FIG. 15 is an exploded perspective view of a short bed installation of a coupler system in accordance with a representative embodiment of the present invention.

As previously discussed, the oblique pyramid configuration of coupler system 100 allows for installation in both short and long bed towing vehicles. With reference to FIG. 14, the offset of the coupler system 100 is mounted in a forward direction so as to position towball 120 towards the proximal end 310 of the long truck bed 320. Further, the offset of the coupler system 100 is mounted in a rearward direction, in a short truck bed 321, so as to position towball 120 toward the distal end 311 of the truck bed 321, as shown in FIG. 15. With the offset in the rearward position, in a short truck bed 321, the normal use of a "slider hitch" is eliminated. Rather, the rearward mounting of coupler system 100 moves the trailer rearward in the truck bed so that the front of the trailer overshot will not collide with the back of the truck cab, for example, as when making tight turns such as when backing up to maneuver a trailer into a desired parking space.

Figure 16A:
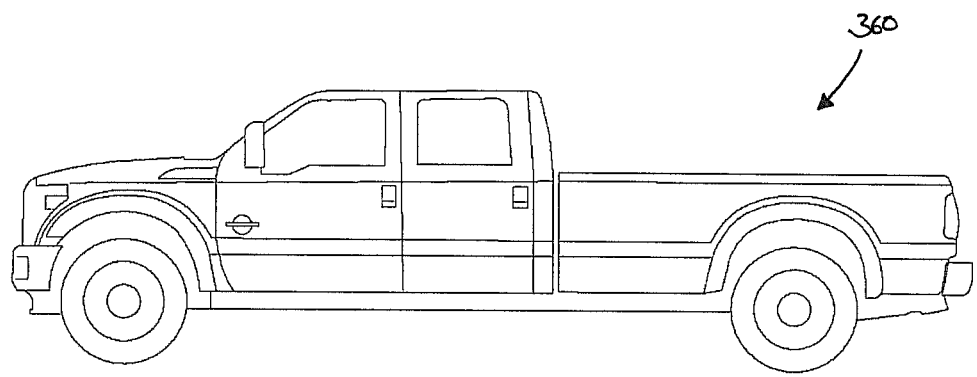
FIG. 16A is a planar view of a long bed towing vehicle in accordance with a representative embodiment of the present invention.
Figure 16B:
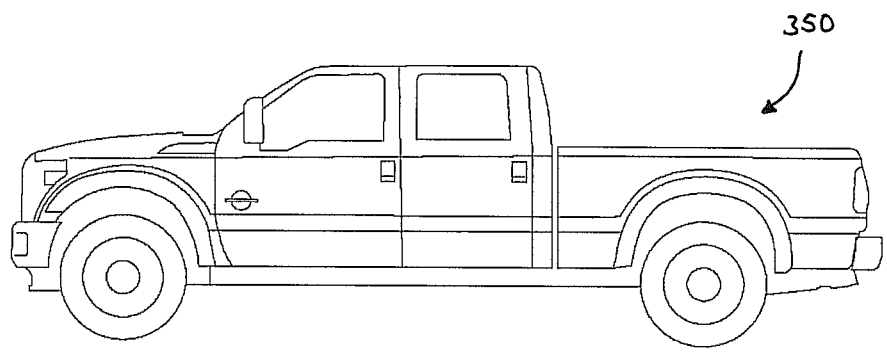
FIG. 16B is a planar view of a short bed towing vehicle, wherein the combination of FIGS. 16A and 16B demonstrate a comparison of load displacement in accordance with a representative embodiment of the present invention.

The interchangeable installation of coupler system 100 further provides improved weight distribution in short bed trucks, as compared to other available coupler systems. Referring now to FIGS. 16A and 16B, a comparison between loading relationships of a short bed installation 350 and a long bed installation 360 is shown. In the illustrated embodiment of FIG. 16A, an eight foot long bed truck is provided with a riser mounted approximately five inches in front of the rear axle, resulting in approximately 30.55 pounds of pressure being applied to the front axle. In the illustrated embodiment of FIG. 16B, a six foot long bed truck is provided with a riser mounted approximately five inches behind the rear axle, resulting in approximately 35.71 pounds of pressure taken off of the front axle. In summary, the weight differential is insignificant, especially when considering the cost and convenience of all other available hitch configurations which are available to eliminate the problems of short bed truck towing of fifth wheel trailers.

Figure 17:
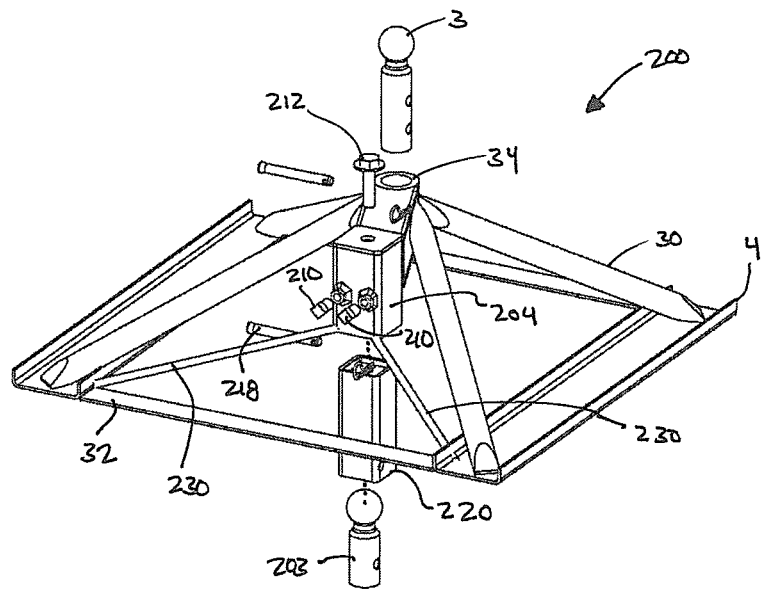
FIG. 17 is an exploded perspective view of a coupler system in accordance with a representative embodiment of the present invention.
Figure 18:
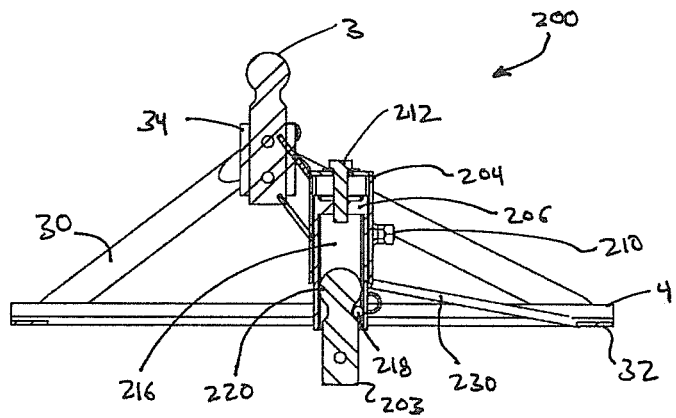
FIG. 18 is a cross-section view of a coupler system in accordance with a representative embodiment of the present invention.

Referring now to FIGS. 17 and 18, a coupler system 200 is shown. In some embodiments, fifth wheel base 4 further comprises an adapter sleeve 204 coupled to a portion of sleeve 34. Adapter sleeve 204 is further supported by struts 230 which are secured to base surface 32. Adapter sleeve 204 is configured to compatibly receive a towball 203 which is fastened to the bed portion, or another portion of a towing vehicle (not shown). For example, some towing vehicles are modified to include a towball in the bed portion of the vehicle so as to receive a gooseneck trailer. Coupler system 200 is configured to compatibly receive the towball 203 thereby being installed in the bed portion of the towing vehicle.

For example, in some embodiments a lumen 206 of adapter sleeve 204 is configured to directly receive and retain towball 203. In other embodiments, lumen 206 is configured to receive a towball adapter sleeve 220, wherein a lumen 216 of towball adapter sleeve 220 is configured to directly receive and retain towball 203, and lumen 206 of adapter sleeve 204 is configured to directly receive and retain towball adapter sleeve 220. Thus, fifth wheel base 4 is secured to the towing vehicle via a secured connection between towball 203 and adapter sleeve 204.

In some embodiments, towball 203 is retained within lumen 216 via a retaining pin 218. Towball adapter sleeve 220 is further retained within lumen 206 via set screws 210. Further, in some embodiments adapter sleeve 204 and towball adapter sleeve 220 are further secured via a bolt 212 that is inserted through an aperture of adapter sleeve 204 and threadedly secured to a set of threads provided in towball adapter sleeve 220, wherein the set of threads are aligned with the aperture of adapter sleeve 204. As bolt 212 is tightened, fifth wheel base 4 is drawn snuggly against the bed or other portion of the towing vehicle. In some embodiments, bolt 212 is tightened until a coefficient of friction is achieved between base 4 and the towing vehicle, which coefficient prevents coupler system 200 from rotating relative to the surface of the towing vehicle during use. Once a desired coefficient is achieved, the position of towball adapter sleeve 220 within lumen 206 is secured via set screws 210.

In some embodiments, coupler system 200 comprises an elevated pedestal or platform, the bottom of which attached to a gooseneck trailer hitch which is installed in or under the bed of a truck or towing vehicle, and wherein the top of the platform or pedestal is configured to adapt to, retain, or receive a towball.

Further, in some embodiments a kingpin or pinbox of a fifth wheel trailer comprises a ball coupler which compatibly receives the towball which is associated with the platform or pedestal of the coupler system 200.

Still further, in some embodiments an elevated pedestal or platform coupler assembly 200 is provided which is configured to couple to a structured assembly attached to the frame of a truck or other towing vehicle, wherein the structured assembly penetrates through the bed of the towing vehicle such that a force exerted on the coupler assembly is transferred to the frame of the towing vehicle via the structured assembly.

In at least some embodiments, the adaptation fits all types of gooseneck hitches, fifth wheel hitches, and/or any type of device that can be anchored to the ball, which is coupled to the frame of the vehicle or a gooseneck hitch.

The present invention may be embodied in other specific forms without departing from its spirit or essential characteristics. For example, the coupler systems of the present invention may comprise materials other than aluminum, such as steel, titanium, cobalt, iron, and alloys thereof. Therefore, the described embodiments are to be considered in all respects only as illustrative and not restrictive.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

What is claimed is:

1. A lightweight coupler system, comprising:
    a base structure having a first end for coupling to a towing vehicle, and a second end having a first towball, wherein the base structure is configured to dispose the first towball at a height approximately equal to a height of a kingpin on a trailer when the base structure is coupled to the towing vehicle; and
    an adapter having a kingpin coupler for coupling to the kingpin, and a towball coupler for directly coupling with the first towball, wherein the kingpin coupler is offset to a side of the towball coupler such that when the adapter is coupled to the kingpin and the first towball, a lowest end of the kingpin is disposed below a highest end of the first towball.

2. A lightweight coupler system as recited in claim 1, wherein the towing vehicle includes a frame having a plurality of rails that are spaced at a predetermined distance so as to compatibly interface with and securely receive the base structure, and wherein a plurality of mounting pegs are configured to be selectively inserted into a corresponding plurality of apertures of the rails to couple the first end of the base structure to the towing vehicle.

3. A lightweight coupler system as recited in claim 2, wherein the rails are located beneath a bed of the towing vehicle.

4. A lightweight coupler system as recited in claim 3, wherein the bed of the towing vehicle includes a plurality of access windows corresponding to the apertures of the rails.

5. A lightweight coupler system as recited in claim 1, further comprising an adapter sleeve for securing the base structure to a second towball coupled to a bed of the towing vehicle.

6. A lightweight coupler system as recited in claim 5, wherein the adapter sleeve is configured to adjustably draw the base structure towards the bed of the towing vehicle once the adapter sleeve is secured to the second towball.

7. A lightweight coupler system as recited in claim 1, wherein the base structure comprises
    an oblique pyramid configuration.

8. A lightweight coupler system as recited in claim 1, wherein the base structure comprises at least one of:
    i. a carbon fiber laminate; and
    ii. a carbon fiber reinforced polymer.

9. A lightweight coupler system as recited in claim 1, wherein a portion of the base structure is configured to extend through a frame of the towing vehicle.

10. A lightweight coupler system as recited in claim 7, wherein the first end of the base structure comprises a base frame and wherein the base structure further comprises four struts that extend between the base frame and the second end of the base structure.

11. A lightweight coupler system, comprising:
    a base structure having a first end for coupling to a towing vehicle, and a second end having a first towball, the first towball being positioned at a height above the first end of the base structure, wherein the base structure is configured to couple to the towing vehicle at a first rotational orientation and at a second rotational orientation that is approximately 180 degrees different from the first rotational orientation, and wherein the first towball is offset from a center of the base structure such that rotation of the base structure from the first rotational orientation to the second rotational orientation moves the first towball closer to or farther from an end of the towing vehicle.

12. A lightweight coupler system as recited in claim 11, wherein the towing vehicle includes a frame having a plurality of rails that are spaced at a predetermined distance so as to compatibly interface with and securely receive the base structure, and wherein a plurality of mounting pegs are configured to be selectively inserted into a corresponding plurality of apertures of the rails to couple the first end of the base structure to the towing vehicle.

13. A lightweight coupler system as recited in claim 12, wherein the rails are located beneath a bed of the towing vehicle.

14. A lightweight coupler system as recited in claim 11, further comprising an adapter sleeve for securing the base structure to a second towball coupled to a bed of the towing vehicle.

15. A lightweight coupler system as recited in claim 14, wherein the adapter sleeve is configured to adjustably draw the base structure towards the bed of the towing vehicle once the adapter sleeve is secured to the second towball.

16. A lightweight coupler system as recited in claim 11, wherein the base structure comprises at least one of:
   i. steel;
   ii. aluminum;
   iii. a carbon fiber laminate;
   iv. a carbon fiber reinforced polymer;
   v. steel alloy; and
   vi. aluminum alloy.

17. A lightweight coupler system as recited in claim 11, wherein a portion of the base structure is configured to extend through a frame of the towing vehicle.

18. A lightweight coupler system as recited in claim 11, wherein the base structure is configured to dispose the towball at a height approximately equal to a height of a kingpin of a fifth wheel trailer when the base structure is coupled to a bed of the towing vehicle.

19. A coupler system comprising:
   an adapter having a kingpin coupler configured to couple to a king pin of a trailer; and
   a towball coupler configured to couple directly to a towball, wherein the kingpin coupler is coupled to and offset to a lateral side of the towball coupler such that when the adapter is coupled to the kingpin and the towball, a horizontal plane is able to pass through both the kingpin and the towball.

20. The lightweight coupler system of claim 1, wherein the base structure is configured to dispose the first towball above the first end of the base structure such that the towball is disposed at a height approximately equal to a height of a towball coupler on a second trailer.

* * * * *